United States Patent [19]
Giordano et al.

[11] Patent Number: 5,359,236
[45] Date of Patent: Oct. 25, 1994

[54] INTEGRATED CIRCUIT THERMAL SENSOR

[75] Inventors: Raymond L. Giordano, Flemington; Thomas R. Deshazo, Jr., Frenchtown, both of N.J.

[73] Assignee: Harris Corporation, Melbourne, Fla.

[21] Appl. No.: 66,854

[22] Filed: May 25, 1993

[51] Int. Cl.⁵ .............................................. H03F 1/30
[52] U.S. Cl. .................................... 307/310; 307/491; 330/288
[58] Field of Search ............... 307/310, 491, 605, 454, 307/455, 456, 466, 313; 328/3, 11; 330/288; 374/178, 183

[56] References Cited

U.S. PATENT DOCUMENTS

| | | | |
|---|---|---|---|
| 4,268,759 | 5/1981 | Gilbert | 307/310 |
| 4,789,819 | 12/1988 | Nelson | 307/310 |
| 5,149,199 | 9/1992 | Kinoshita et al. | 307/310 |

Primary Examiner—Timothy P. Callahan
Assistant Examiner—My. Trang Nu Ton
Attorney, Agent, or Firm—Henry I. Schanzer; C. C. Krawczyk; W. A. Troner

[57] ABSTRACT

A normally non-conducting control device whose turn-on threshold decreases with increasing temperature is supplied with a control voltage which increases with temperature for causing a more rapid increase in the conduction of the control device when a predetermined temperature is exceeded.

10 Claims, 2 Drawing Sheets

INTEGRATED CIRCUIT THERMAL SENSOR

BACKGROUND OF THE INVENTION

This invention relates to a thermal sensing circuit and, in particular, to a thermal sensing circuit, using few components, for producing a relatively large output signal for small changes in temperature.

Thermal sensors are needed in a multitude of applications, such as sensing when or whether a critical temperature has been exceeded or whether a malfunction has occurred. By way of example, when a malfunction such as a short circuit occurs on or about a circuit, excessive current flows and the power dissipation increases, resulting in the rise of temperature on or about the circuit. When a malfunction has been detected or a critical temperature exceeded, it is generally necessary to respond quickly.

A problem with prior art thermal sensing circuits is that they rely on the change in one parameter to control the turn on or turn off of a controlled device. As a result large changes in temperature must occur to obtain a noticeable response, if additional amplification is not introduced.

This is best explained with reference to FIG. 1A which shows that a portion of a band gap voltage ($KV_{BG}$) is applied between the base and emitter of a bipolar transistor Q1, also referred to herein as the controlled device. Generally, the band gap voltage, $KV_{BG}$, applied to the base of Q1 is held at a relatively fixed value as a function of temperature, as shown in FIG. 1B. Temperature sensing is achieved by relying on the well known principle that the base-to-emitter voltage ($V_{BE}$) Of a bipolar transistor decreases at a predetermined rate (e.g., $-2$ millivolts per degree centigrade for low level currents), as shown in FIG. 1B. Therefore, in operation, the collector current through Q1 increases with temperature as a function of the difference between the fixed $KV_{BG}$ and the decreasing value of the $V_{BE}$ of Q1. However, the increase in the collector current is relatively slow and shallow. Note that the "effective" input signal is the difference between the base voltage ($KV_{BG}$) and the $V_{BE}$ of Q1 which is decreasing at the predetermined rate shown in FIG. 1B. Assuming 75° C. to be a critical point at which a response is desired, there must be a substantial increase in temperature above the critical temperature before Q1 saturates and causes the voltage at its collector to go to, or close to, ground potential.

FIG. 1A illustrates the application of a fixed reference voltage $KV_{BG}$ to the base of a transistor, Q1. Assume, for example, that $KV_{BG}$ is equal to 500 mv. Assume further that the $V_{BE}$ of Q1 is 600 mv at 25° C. and that its $V_{BE}$ decreases at the rate of approximately $-2$ mv/°C. Thus, when the temperature reaches 75° C., the $V_{BE}$ of Q1 is equal to 500 mv and Q1 is ready to start conducting. The relationship between $KV_{BG}$ and the $V_{BE}$ of Q1 is shown in FIG. 1B. As the temperature increases above 75° C., Q1 starts conducting but it will not be turned-on hard until the temperature reaches a substantially higher value. Assuming that the $V_{BE}$ of Q1 decreases by $-2$ millivolts per degree centigrade and that the collector current of Q1 increases by 4 per cent for each millivolt of added bias to the base voltage, there must be a very large temperature change to effectuate a significant change in the collector current. Therefore, a problem exists when it is desired to have significant current flow for small temperature change above the critical values.

Admittedly, a greater change in collector current for a smaller change in temperature may be obtained by the insertion of amplifiers at the output (collector) of Q1. However, there are many systems in which it is undesirable to introduce the use of amplifiers either because of cost consideration and/or where the reduction in the number of components is of importance.

Thus, it is desirable and/or necessary to have a simple thermal sensing system in which relatively large currents (or voltages) can be produced for small changes in temperature about a critical temperature.

SUMMARY OF THE INVENTION

Accordingly, circuits embodying the invention include a means for generating a turn-on signal which increases with increasing temperature and for applying this turn-on signal to a control device whose turn-on threshold decreases with temperature.

One aspect of the invention includes circuitry for sensing the difference between the base-to-emitter voltages of transistors to produce a turn-on signal which is a function of temperature and independent of any other factor and to use the turn-on signal in combination with the change in base-to-emitter voltage ($V_{BE}$) of a transistor as a function of temperature to produce an effective input signal for a control device.

BRIEF DESCRIPTION OF THE DRAWING

In the accompanying figures, like reference characters denote like components.

DETAILED DESCRIPTION OF THE INVENTION

Figure 2:
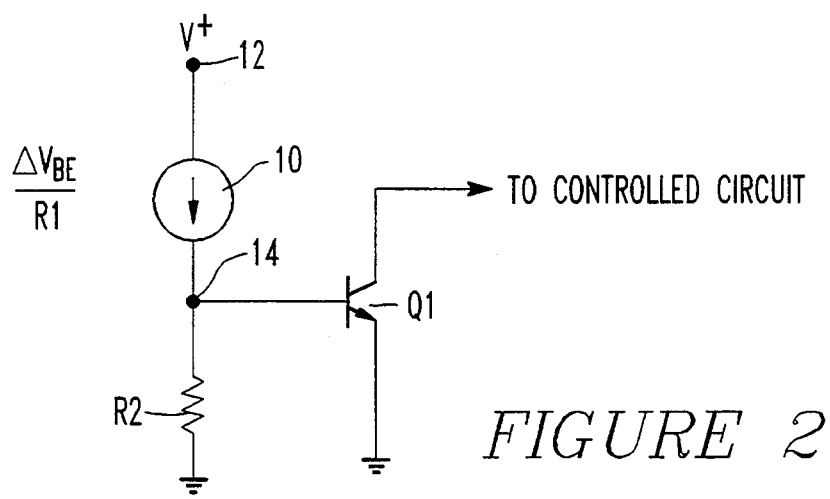
FIG. 2 is a simplified schematic diagram of a thermal sensing circuit embodying the invention.

FIG. 2 is an idealized and simplified representation of a circuit embodying the invention. Referring to FIG. 2, there is shown a temperature dependent current source 10 connected between a power terminal 12 to which is applied a source of operating potential of $+V$ volts and a node 14 to which is connected the base of a transistor Q1 and one end of a resistor R2. The emitter of transistor Q1 and the other end of resistor R2 are connected to ground potential.

As detailed below, the current source 10 has a positive temperature coefficient and produces a current IC which is equal to $\Delta V_{BE}/R1$; where $\Delta V_{BE}$ is equal to $kT/q \ln(n)$; and where $k/q$ is the ratio of the Boltzmann's constant to the unit of electronic charge (86.17 $\mu V/°K$), T is the absolute temperature in °K, and $\ln(n)$ is a fixed ratio of transistor areas. Therefore, it is evident that $\Delta V_{BE}$ increases linearly with temperature.

The current flowing through R2 and the voltage developed at the base 14 of Q1 is equal to $(\Delta V_{BE})(R2/R1)$. Clearly, if R2 and R1 are made of similar materials and placed close to each other, whereby they are thermally coupled, then the effect of the variations of R1 and R2 as a function of temperature, and/or processing, will be significantly reduced, if not eliminated. The net result is that a current IC is supplied to node 14 and a turn-on (or control) voltage (signal) is generated which increases linearly as a function of increasing temperature.

As already noted, the $V_{BE}$ of Q1 decreases at a predetermined rate (e.g., assume, by way of example, $-2$ mv/°C.) with increasing temperature. Hence, in circuits embodying the invention, the conductivity of the controlled device Q1 is a function of both its decreasing $V_{BE}$ with temperature and, at the same time, the temperature dependent increasing turn-on signal applied to its base.

Figure 1A:
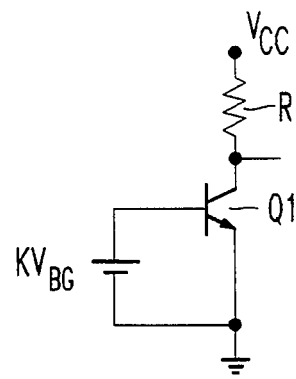
FIG. 1A is a simplified schematic diagram of a prior art thermal sensing circuit.
Figure 1B:
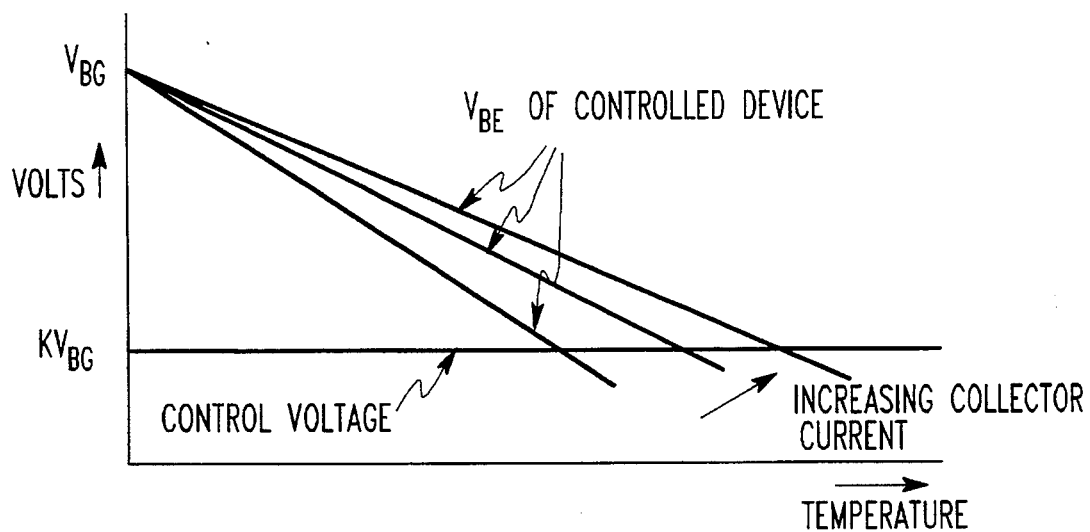
FIG. 1B is a graphical representation of the operating principal employed in the prior art circuit of FIG. 1A.
Figure 3:
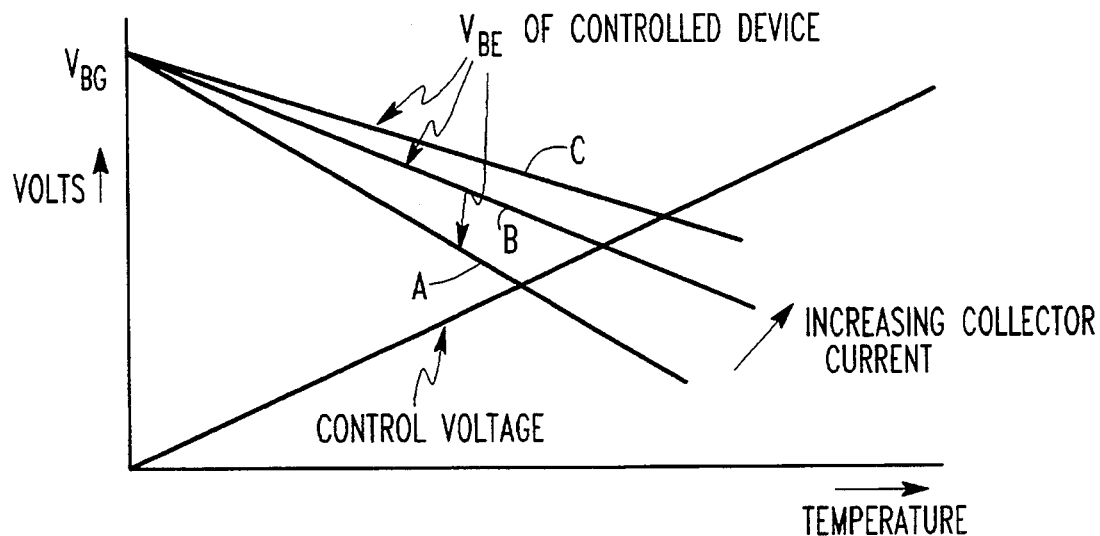
FIG. 3 is a graphical representation of the operating principal in accordance with the invention.

The benefit of the invention may be better appreciated by referring to FIG. 3 which shows curves representing the increasing control voltage (i.e., V14, the voltage developed at node 14) as a function of temperature and the decreasing $V_{BE}$ of transistor Q1. [Note that curves A, B and C of FIG. 3 correspond to the $V_{BE}$ characteristics of the transistor for different values of transistor currents. Assuming that curve A is $-2$ mv/°C., curve B (for higher collector currents) would be at $-1.8$ mv/° and curve C (for still higher collector currents) would be at $-1.6$ mv/°C.] The "effective" input signal is the combination of the control voltage $(\Delta V_{BE})(R2/R1)$ and the change in $V_{BE}$ of Q1 as a function of temperature. This combination clearly results in a larger "effective" input signal than the one provided solely by $V_{BE}$ and causes a greater change in the collector-to-emitter current of Q1.

Figure 4:
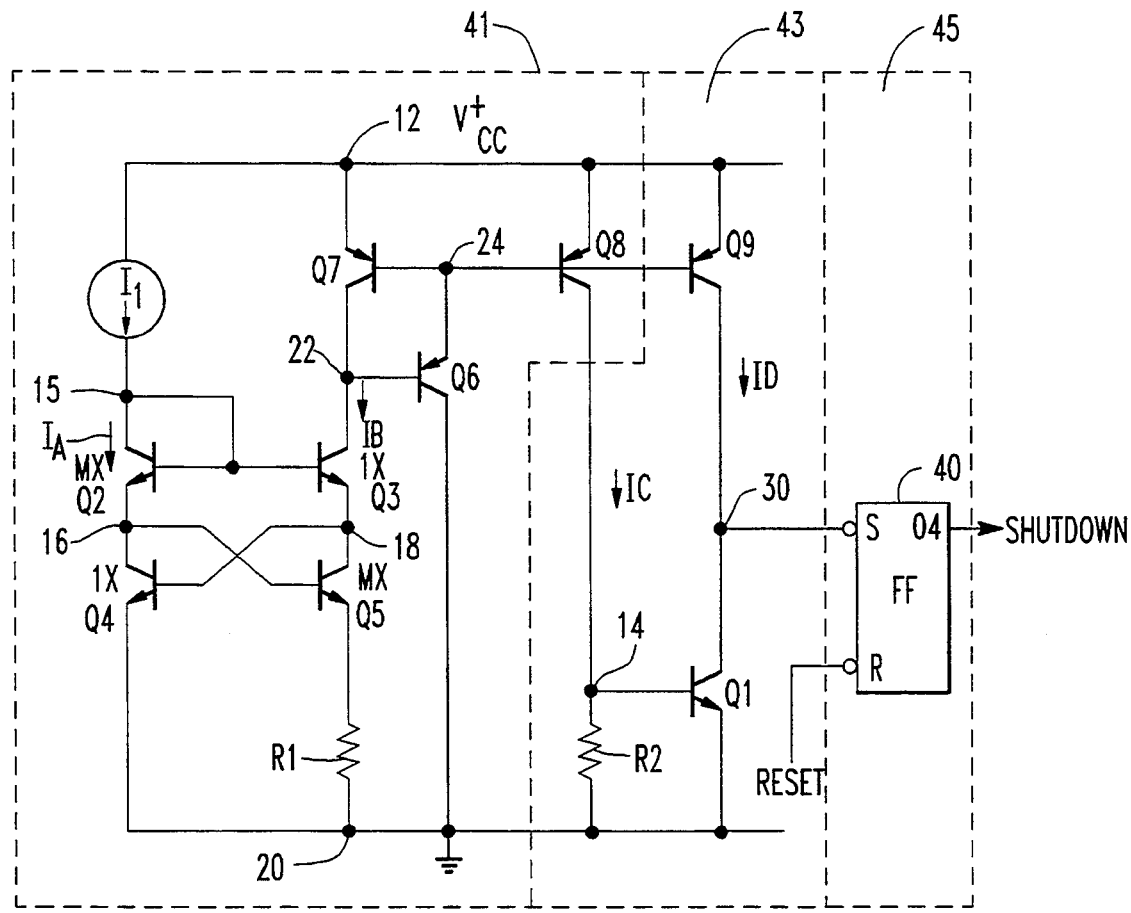
FIG. 4 is a schematic diagram of a thermal sensing circuit embodying the invention.

FIG. 4 depicts a preferred circuit for generating $\Delta V_{BE}/R1$ (the turn-on signal) and the application of that signal to the base of Q1. Referring to FIG. 4, it is seen that the thermal sensor circuit includes a first section 41 for producing a current IB which is a function of $\Delta V_{BE}/R1$, a second control section 43 for applying IB to the control device Q1 and R2 and a thermal shutdown section 45.

The section 41 includes a current source 13 connected between a first power terminal 12 to which is applied an operating potential of $V_{cc}$ volts and a node 15. The current source 13 may be a resistor, or a transistor biased into conduction, or any other means suitable to produce a current I1. The bases of two NPN bipolar transistors Q2 and Q3 and the collector of Q2 are connected to node 15. The emitter of Q2 is connected to a node 16 to which is connected the collector of an npn bipolar transistor Q4 and the base of an NPN bipolar transistor Q5. The emitter of Q3, the base of Q4 and the collector of Q5 are connected in common to a node 18. The emitter of Q5 is connected to one end of a resistor R1. The other end of resistor R1 and the emitter of Q4 are connected to ground terminal 20. The collector of Q3 is connected to a node 22 to which is connected the collector of a PNP bipolar transistor Q7 and the base of a PNP bipolar transistor Q6.

The emitter of Q7 is connected to terminal 12. The emitter of Q6 and the bases of PNP bipolar transistor Q7, Q8 and Q9 are connected in common to node 24. Transistors Q6, Q7, and Q8 form a current mirror amplifier (CMA) with the collector current IC flowing in the collector of Q8 being proportional to, and the mirrored value of, the current IB flowing in the collector of Q3. The current IB is equal to the collector current I7 flowing via Q7 into node 22 (note that Q6 functions to reduce any base current error). As detailed below, the current IC is proportional to the current flowing in R1 and, for the condition of Q7 and Q8 being the same size, IB will be substantially equal to IC.

The collector current IB is also mirrored via PNP bipolar transistor Q9 whose emitter is connected to terminal 12, whose base is connected to node 24 and whose collector is connected to an output node 30. The collector current I9 of Q9 flows into node 30.

The collector of Q8 is connected to node 14 to which is connected the base of NPN bipolar transistor Q1 and one end of resistor R2. The other end of resistor R2 and the emitter of Q1 are connected to ground terminal. The collectors of Q1 and Q9 are connected in common to node 30 to which is connected the set input of a set-reset flip-flop 40.

The operation of the circuit of FIG. 4 is as follows. Assume that current source 13 is a resistor and that a current I1 flows into node 15. The current I1 flows into the collector of Q2 and into the bases of transistors Q2 and Q3, whereby these transistors are turned on and currents flow in their collector-to-emitter paths.

The relationship of the various currents in section 41 may be derived and/or determined as described below.

The voltage (V15) at node 15 to which the bases of Q2 and Q3 are connected may be expressed as follows:

$$V15 = V_{BEQ4} + V_{BEQ3} = V_{BEQ2} + V_{BEQ5} + IBR1 \quad \text{(eg. 1)}$$

Equation 1 may be rewritten as follows:

$$IBR1 = (V_{BEQ3} - V_{BEQ5}) + (V_{BEQ4} - V_{BEQ2}) \quad \text{(eg. 2)}$$

Note that:
a) Current I1 flows through Q2 and Q4 and Q2 is made n times the size of Q4;
b) Current IB flows through Q3 and Q5 and Q5 is made n times the size of Q3;
c) $V_{BEQ2}$ may be expressed as $(kT/q)\ln(I1/nIs)$;
d) $V_{BEQ4}$ may be expressed as $(kT/q)\ln(I1/Is)$;
e) $V_{BEQ3}$ may be expressed as $(kT/q)\ln(IB/Is)$;
f) $V_{BEQ5}$ may be expressed as $(kT/q)\ln(IB/nIs)$;
g) the term $(V_{BEQ3} - V_{BEQ5})$ may be expressed as:

$(kT/q)\ln(IB/Is) - (kT/q)\ln(IB/nIs) = (kT/q)\ln(IB \cdot /Is)(nIs/IB) = (kT/q)\ln(n);$ and
h) the term $(V_{BEQ4} - V_{BEQ2})$ may be expressed as:

$(kT/q)\ln(I1/Is) - (kT/q)\ln(I1/nIs) = (kT/q)\ln(n).$

Hence, IBR1 referred to herein as $2\Delta V_{BE}$ may be expressed as follows:

$$IBR1 = (2kT/q)\ln(n) \quad \text{(eg. 3)}$$

Note that IBR1 is independent of currents I1 and IB. IB, in turn, may be expressed as follows:

$$IB = 2\Delta V_{BE}/R1 = 2[kT/q][\ln(n)](1/R1) \quad \text{(eg. 4)}$$

where k is Boltzmann's constant, T is the absolute temperature in °K, q is the charge on an electron, and n is the ratio of the areas of two transistors. k/q and ln(n) are constants and temperature independent. Hence, the current generator comprised of transistors Q2 through Q5 and resistor R1 produces a current IB which is directly proportional to temperature T and inversely proportional to resistor R1.

At 300° K, $\Delta V_{BE}$ is approximately equal to (26 millivolts)[ln(n)] in millivolts. This $\Delta V_{BE}$ potential is proportional to temperature. Thus, as the temperature increases, IB increases at a rate equal to $(2/R1)(\Delta V_{BE})$ where $\Delta V_{BE}=[kT/q][\ln(n)]$. The temperature variations of R1 included in IB are eliminated by feeding the current IB into a resistor R2, of like type to R1, as discussed below.

The current through R1 is very nearly equal to the current IB flowing through Q3 and out of the collector of Q7. This current is mirrored via Q7 and Q8 whereby the current IC flowing from the collector of Q8 into node 14 is proportional (i.e., essentially equal when Q7 and Q8 are made the same size) to IB. The voltage drop (V14) produced at node 14 is equal to (IB)×(R2). Since IB is equal to $[2/R1][\Delta V_{BE}]$, V14 may be expressed as follows: $V14=2[\Delta V_{BE}][R2/R1]$.

R2 is made of the same material as R1 and R1 and R2 are formed in close proximity to each other. As a result, the ratio of R2/R1 remains constant as a function of temperature. Consequently, in the circuit of FIG. 4, V14 may be expressed as $K_A T$; where $K_A$ is a constant equal to $(2)(K/q)\ln(n)(R2/R1)$. Hence, V14 which is the control voltage applied to the base of Q1, is purely proportional to temperature variations, increasing directly and linearly (i.e., $V14=K_A T$) with increasing temperature.

At the same time the $V_{BE}$ of Q1 decreases at a predetermined rate (assume, for example, $-2$ mv/°C.). Hence, for the assumed value of $-2$ mv/°C., the amplitude of the "effective" signal driving Q1 is equal to $K_A T + 2$ mv/°C.

Hence, Q1 is driven by an "effective" signal which is the combination (absolute sum) resulting from the positive temperature coefficient of the $\Delta V_{BE}$ signal and the negative temperature coefficient of the $V_{BE}$ of Q1. As the temperature increases and a critical temperature value is reached, Q1 begins to conduct. As discussed above, the conduction of Q1 is accelerated by the combination of the $\Delta V_{BE}$ and the $V_{BE}$ signals. When the current sunk by Q1 exceeds the current supplied by Q9, node 30 goes low, at or close to ground potential. This condition sets flip-flop 40, causing its output 04 to go high and initiating the shut down of power to the integrated circuit (not shown) on which the thermal sensor is formed.

In one embodiment, the ratio of R2 to R1 was made equal to 4.4 and the ratio (n) of transistor areas was made equal to 4. For these values, $\Delta V_{BE}$ increased by approximately 1 millivolt per °C. The ratio of R2 to R1 may be increased to increase the effective amplification of the system. Likewise, the ratio (n) of transistor areas may be increased. Thus, $\Delta V_{BE}$ can be made to increase by more than one millivolt per °C. increasing the rate of change of conduction with which Q1 is turned on as a function of rising temperature.

The invention has been illustrated using a particular $\Delta V_{BE}/R1$ generator applied to the base of a controlled device (Q1). However, it should be appreciated that any other means generating a control voltage (V14) which is proportional to temperature ($K_A T$) could be used instead.

The invention has been illustrated using an NPN bipolar control device, Q1. However, it should be evident that a PNP bipolar control device could be used instead. In this case, to increase conduction in the PNP bipolar, an increasing temperature dependent current would have to be drawn out of the base of the PNP transistor to increase its conduction concurrently with the decrease of its $V_{BE}$ with temperature. The current drawn out of the base increases with temperature to increase the turn-on of the PNP bipolar transistor.

The invention has been illustrated for the condition where Q1 is turned-on when a critical temperature is reached. It should be understood that the circuit could be designed to turn off conduction when a critical condition is reached.

It should be appreciated that the components of the circuit of FIG. 4 are preferably formed on the same integrated circuit (IC) and are part of a larger integrated circuit.

What is claimed is:

1. A thermal sensor comprising:
   a bipolar transistor having a base, an emitter and a collector; said bipolar transistor being characterized in that its base to emitter voltage ($V_{BE}$) decreases as a function of increasing temperature to which the bipolar transistor is subjected during operation;
   a first means, coupled to the base of said bipolar transistor for supplying an increasing turn on signal to the base of said bipolar transistor as a function of increasing temperature; said first means including:
   (a) first, second, third and fourth transistors of same conductivity type, each transistor having a base, an emitter and a collector;
   (b) means coupling the bases of said first and second transistors and the collector of the first transistor to a first node;
   (c) means coupling a source of current to said first node of a polarity to induce conduction in said first and second transistors;
   (d) means connecting the collector of the third transistor and the base of the fourth transistor to the emitter of the first transistor;
   (e) means connecting the collector of the fourth transistor and the base of the third transistor to the emitter of the second transistor;
   (f) means connecting the emitter of said third transistor to a point of operating potential;
   (g) a first resistor connected between the emitter of the fourth transistor and the point of operating potential;
   (h) a second resistor connected between the base and emitter of said bipolar transistor; and
   (i) means coupling the collector of said second transistor to the base of said bipolar transistor for producing a voltage at the base of said bipolar transistor which has a positive temperature coefficient and which is substantially independent of power supply variations;
   means coupling the emitter of said bipolar transistor to the point of operating potential; and
   a load circuit coupled to the collector of said bipolar transistor, said bipolar transistor controlling the load current to said load as a function of the increasing turn-on signal generated by said first means and the decreasing $V_{BE}$ of said bipolar transistor in response to increasing temperatures.

2. The thermal sensor of claim 1 wherein said first and second resistors have the same temperature coefficients and are designed to be formed in close proximity to sense similar temperatures.

3. The thermal sensor of claim 1 wherein said first, second, third and fourth transistors are formed in close proximity to each other to sense similar temperatures.

4. The thermal sensor of claim 3, wherein said means coupling the collector of said second transistor to the base of said bipolar transistor includes a current mirror amplifier responsive to the current flowing in the collector to emitter of said second transistor for supplying a current proportional thereto to the base of said bipolar transistor.

5. The thermal sensor of claim 4, wherein said load circuit coupled to the collector of said bipolar transistor includes means for supplying a current to the collector of said bipolar transistor which is approximately equal to the current supplied to the base of said bipolar transistor.

6. The thermal sensor of claim 4, wherein said current mirror amplifier (CMA) has an input and an output, the input of said CMA being connected to the collector of said second transistor, and the output of said CMA being connected to the base of said bipolar transistor.

7. The thermal sensor of claim 4, wherein said current mirror amplifier (CMA) has an input and first and second outputs, the input of said CMA being connected to the collector of said second transistor the first output of said CMA being connected to the base of said bipolar transistor and the second output of said CMA being connected to the collector of said bipolar transistor, said CMA supplying approximately equal currents at its first and second outputs.

8. The thermal sensor of claim 1, wherein said first means supplies a signal current to said base of said bipolar transistor which is directly proportional to the temperature and inversely proportional to said first resistor; and wherein said second resistor is connected between the base and emitter of said bipolar transistor for producing a signal voltage across the base to emitter of said bipolar transistor which is a function of the temperature and independent of the changes of the first and second resistors as a function of temperature.

9. The thermal sensor of claim 1, wherein all the components are formed on the same integrated circuit.

10. A thermal sensor comprising:

a bipolar transistor having a base, an emitter and a collector; said bipolar transistor being characterized in that its base to emitter voltage ($V_{BE}$) decreases as a function of increasing temperature to which the bipolar transistor is subjected;

a first means, coupled to the base of said bipolar transistor for supplying a control signal to the base of said bipolar transistor, the amplitude of said control signal being proportional to temperature and of a polarity to turn-on said bipolar transistor for increasing temperatures;

means coupling the emitter of said bipolar transistor to a point of operating potential;

a load circuit coupled to the collector of said bipolar transistor, said bipolar transistor controlling the load current to said load as a function of the control signal generated by said first means and the decreasing $V_{BE}$ of said bipolar transistor in response to increasing temperatures; and wherein said first means includes:

(a) a current generator which produces a current which is a function of the difference between the base-to-emitter voltages (VBE) of two transistors divided by a first resistor (R1), where the current so produced increases as a function of temperature; and (b) a current mirror amplifier coupled between the current generator and the base of the bipolar transistor.

* * * * *